Dec. 18, 1956    E. R. FITZGERALD    2,774,239
APPARATUS FOR DETERMINING DYNAMIC MECHANICAL
PROPERTIES OF VISCOELASTIC MATERIALS
Filed July 26, 1952      3 Sheets-Sheet 1
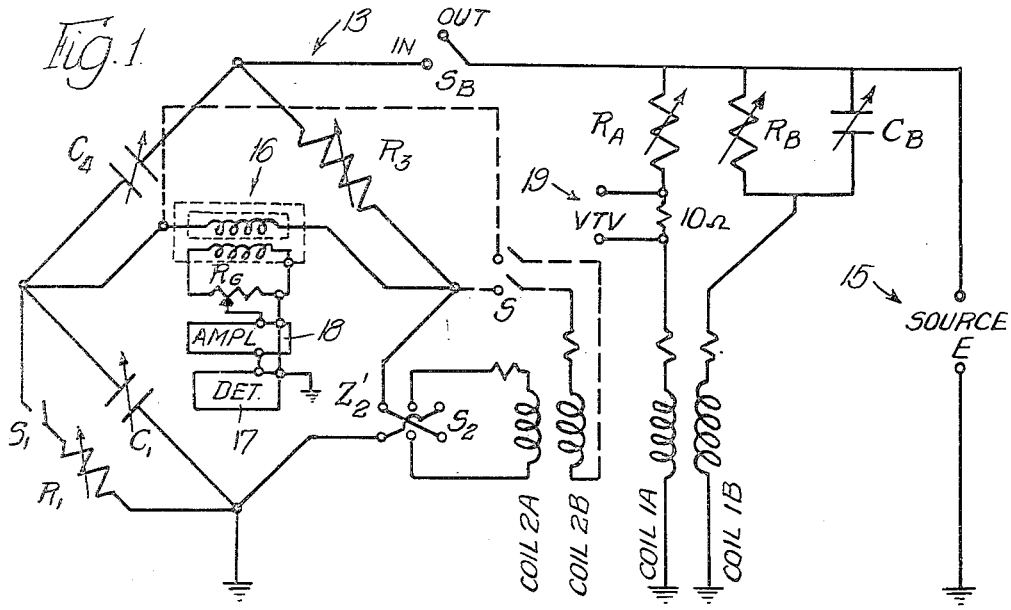
COILS 1A & 2A ARE MECHANICALLY COUPLED
COIL 1A — DRIVING COIL
COIL 1B — SHIELDING COIL (STATIONARY)
COIL 2A — DRIVING COIL
COIL 2B — MUTUAL INDUCTANCE TEST COIL (STATIONARY)
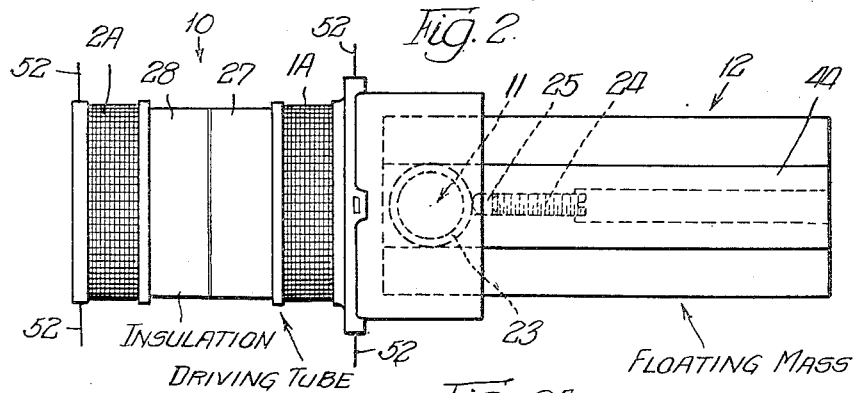
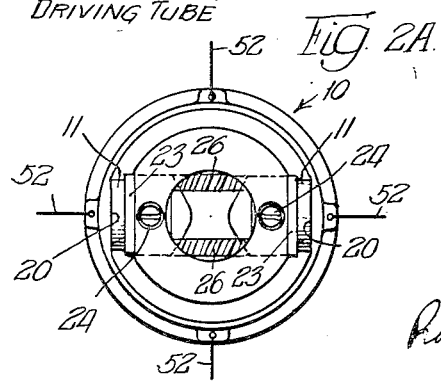
INVENTOR.
Edwin R. Fitzgerald,
BY
Robert R. Lockwood
atty.

Dec. 18, 1956     E. R. FITZGERALD     2,774,239
APPARATUS FOR DETERMINING DYNAMIC MECHANICAL
PROPERTIES OF VISCOELASTIC MATERIALS
Filed July 26, 1952     3 Sheets-Sheet 2
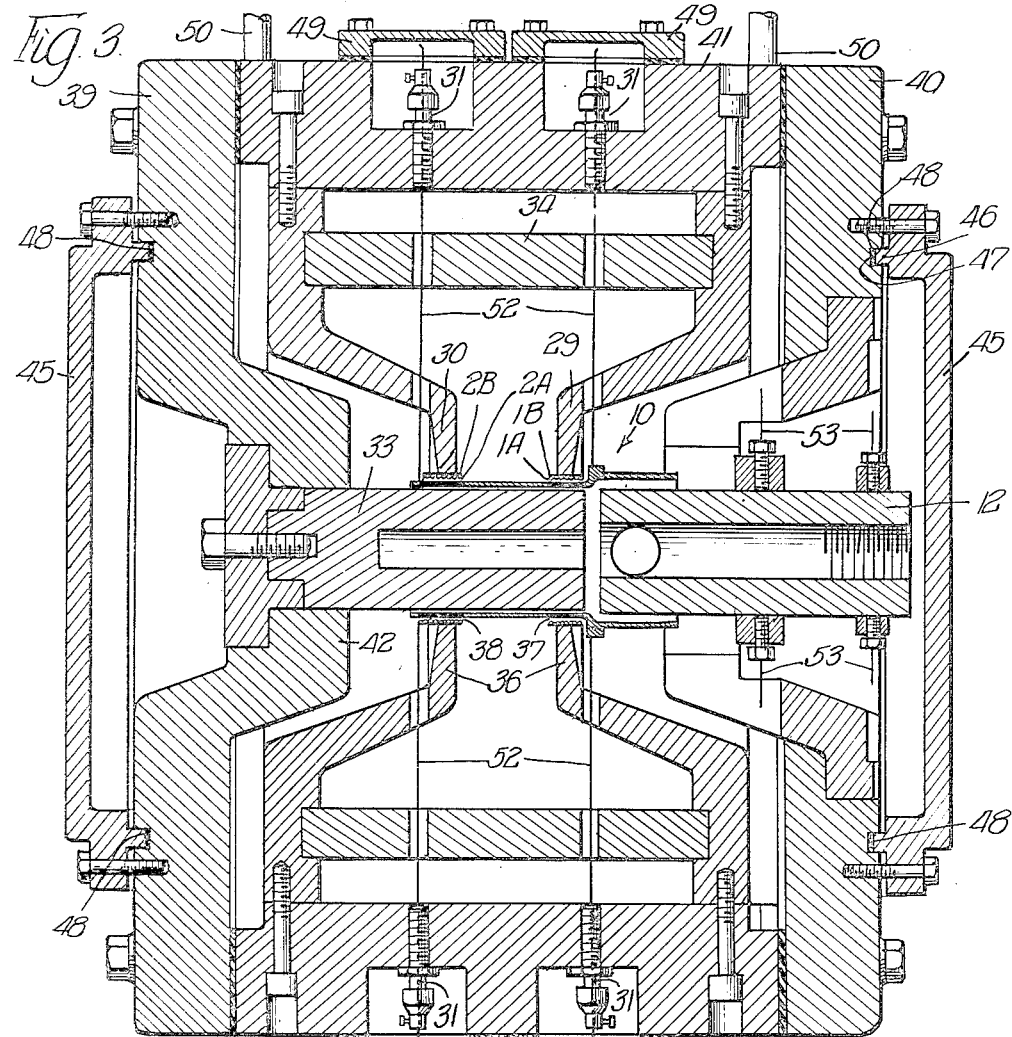
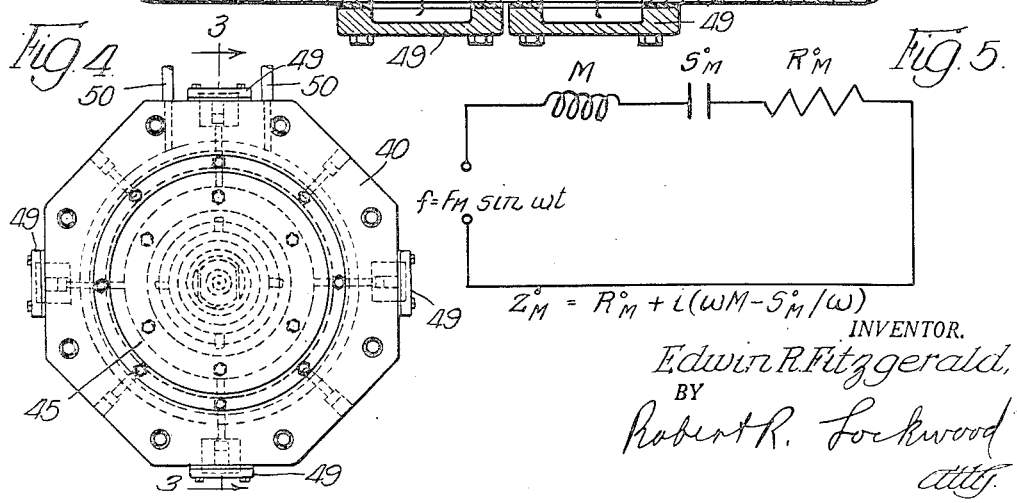
$$Z^\circ_M = R^\circ_M + i(\omega M - S^\circ_M/\omega)$$
$f = F_M \sin \omega t$
INVENTOR.
Edwin R. Fitzgerald,
BY
Robert R. Lockwood
Atty.

Dec. 18, 1956  E. R. FITZGERALD  2,774,239
APPARATUS FOR DETERMINING DYNAMIC MECHANICAL
PROPERTIES OF VISCOELASTIC MATERIALS
Filed July 26, 1952  3 Sheets-Sheet 3

INVENTOR.
Edwin R. Fitzgerald
BY
Robert R. Lockwood
Atty

United States Patent Office 2,774,239
Patented Dec. 18, 1956

2,774,239

APPARATUS FOR DETERMINING DYNAMIC MECHANICAL PROPERTIES OF VISCOELASTIC MATERIALS

Edwin R. Fitzgerald, Madison, Wis., assignor to Wisconsin Alumni Research Foundation, Madison, Wis., a corporation of Wisconsin Application July 26, 1952, Serial No. 301,061

24 Claims. (Cl. 73—67)

This invention relates, generally, to measuring apparatus and in particular relates to apparatus for determining dynamic mechanical properties of viscoelastic materials.

Among the objects of this invention are: to measure dynamic mechanical properties of viscoelastic materials such as plastics and rubber-like solids; to measure these properties over a wide range of temperature and frequency; to provide simple, efficient, accurate, and precise means for so doing; to measure mechanical impedance or admittance in terms of electrical resistance and capacitance; to provide a novel electric circuit for so doing; to provide for measurements of complex viscosity, complex fluidity, complex shear modulus, and complex shear compliance and related quantities such as absolute rigidity, mechanical loss factor, dynamic work function, tangent of the loss factor angle, energy stored and released per cycle, energy dissipated per second, energy dissipated per cycle on samples ranging from liquids and soft gels to hard or stiff solids over a very wide temperature range over a continuous frequency range from 1 to 100,000 cycles per second; to provide a double transducer system in which the two coils are rigidly connected so they move with the same velocity, including means to compensate for the mutual inductance between the coils; to provide means for substantially mechanically isolating the sample and moving parts from the main body of the apparatus; and to provide an apparatus that can be completely immersed in a temperature-controlling liquid.

Other objects of this invention will, in part, be obvious and in part appear hereinafter.

This invention is disclosed in the construction shown in the accompanying drawings and it comprises features of construction, combination of elements, and arrangements of parts which will be exemplified in the construction to be described here and the scope of the application of which will be indicated in the appended claims.

For a more complete understanding of the nature of the scope of this invention reference may be had to the detailed description which follows together with the accompanying drawings, in which:

Figure 1 is a diagram of the electrical measuring circuit;

Figure 2 shows the driving tube and related parts together with the floating mass all of which will be described in detail;

Figure 2A is an end view of Figure 2;

Figure 3 is a longtiudinal sectional view on line 3—3 through the apparatus including the elements shown in Figure 4;

Figure 4 is an end view of the apparatus shown in section in Figure 3;

Figure 5 is the electrical analogue of the mechanical system without a sample;

Figure 8:
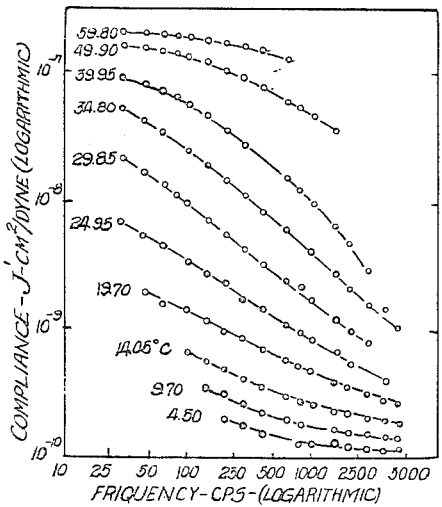
Figure 9:
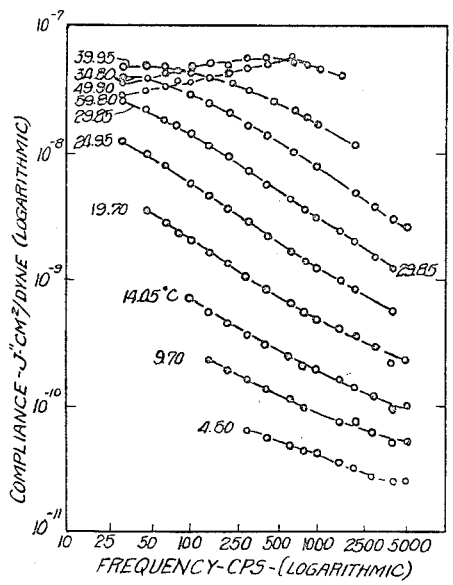

Figure 8 shows curves which demonstrate the variation of the real part of the dynamic shear compliance, J', with frequency and temperature for a polyvinyl chloride-dimethyl thianthrene plastic (40% polymer by volume); and Figure 9 shows curves which demonstrate the variation of the imaginary part of the dynamic shear modulus, J'', with frequency and temperature for a polyvinyl chloride-dimethyl thianthrene plastic.

In accordance with this invention mechanical impedance (defined as force/velocity) is measured in terms of electrical quantities, e. g. electrical resistance and capacitance. For purposes of developing the theory, in general, consider a rigid tube with coils wound around the ends and suspended by eight fine wires so that it is free to move along its axis as shown in Figure 2. If coil 1A is in a magnetic field of uniform and constant flux density $B_1$ whose direction is perpendicular to the wire in the coil, then an alternating current $i_1 = I_m \sin \omega t$ passed through the coil will cause a force $f = F_m \sin \omega t$ to be exerted on the coil according to Ampere's law $$f(\text{Newtons}) = B_1 l_1 i_1 (\text{Webers/m.}^2, \text{meters, amperes})$$

where $l_1$ is the length of wire in coil 1A. The tube will consequently oscillate with a velocity $$v = V_m \sin (\omega t + \theta) = f/Z_M^0$$

where $Z_M^0$ is the mechanical impedance arising from the mass of the tube and coils and $\theta$ is the phase shift due to $Z_M^0$. Furthermore if coil 2A is in a similar field of magnetic flux density $B_2$, then the open circuit voltage generated in coil 2A due to the motion of the tube 10 is, from Faraday's law of motional E. M. F., $$e_2(\text{volts}) = B_2 l_2 v (\text{Webers/m.}^2, \text{meters, meters/sec.})$$

Combining these relations we have the fundamental expression for a double transducer $$Z_M^0 = f/v = (B_1 l_1 B_2 l_2) i_1 / e_2 \qquad (1)$$

which gives the mechanical impedance in terms of an electrical transfer admittance $Y_{12} = i_1/e_2$. In arriving at Equation 1 it has been tacitly assumed that the coils are securely fastened to the tube 10 and that the entire unit is rigid so that it moves with a single velocity $v$. The voltage induced in coil 2A due to mutual inductance between the coils 1A and 2A has also been neglected or assumed small as compared to the motional E. M. F.; an assumption which will not be valid for stiff samples or high frequencies unless provision is made for eliminating the effective mutual inductance between the coils. The manner in which this is done will be described in a later section.

The motion of the tube 10 can be modified by introducing a sample 11 (of viscoelastic material) between the tube and the heavy floating mass 12 as shown in Figure 2. The total mechanical impedance opposing the applied force is then $Z_M = Z_M^0 + Z_M'$ where $Z_M'$ is the mechanical impedance of the sample, the components of which may be functions of frequency and temperature.

By combining measurements made with and without a sample $$Z_M'(\text{sample}) = Z_M - Z_M^0$$

where the values of $Z_M$ and $Z_M^0$ are found in terms of the measured complex ratio $i_1/e_2$ and a known value of $B_1 l_1 B_2 l_2$.

From the value of mechanical impedance and knowledge of the sample dimensions, a complex dynamic viscosity $\eta^{\ddagger} = \eta' - i\eta''$ or a complex dynamic rigidity $G^{\ddagger} = G' + iG''$ (where $i = \sqrt{-1}$) can be calculated for the material tested. Thus, if a disc-shaped sample 11 of cross-sectional area A and thickness $h$ is sheared between the tube 10 and the heavy floating mass 12 we have by definition $f/v = Z_M'$ where $f$ is the applied shearing force acting on the sample, but we also have, $$\eta^{\ddagger} = \frac{f/A}{d\alpha/dt}$$

where $\alpha$ is the shear strain. For a disc-shaped sample 11 $d\alpha/dt = v/h$ or $\eta^{\ddagger} = (h/A)(f/v) = (h/A)Z_M'$ giving the relationship between the complex shear viscosity and the measured complex mechanical impedance $Z_M'$. Since it can be shown that $G^{\ddagger} = i\omega\eta^{\ddagger}$ in terms of complex shear modulus, we have $G^{\ddagger} = i(\omega h/A)Z_M'$. In terms of complex compliance or fluidity the sample properties would be described by a compliance $J^{\ddagger} = J' - iJ'' = 1/G^{\ddagger}$ or a fluidity $\mu^{\ddagger} = \mu' + i\mu'' = 1/\eta^{\ddagger}$.

In actual practice mechanical impedance (or admittance) is measured by the electrical circuit shown in Figure 1 which is designed to take advantage of the special features of a double transducer. One of the driving coils 2A is connected by reversing switch $S_2$ in the arm of the bridge 13 where it acts as an impedance $Z_2'$, while the other driving coil 1A in series with a resistance $R_A$ parallels the bridge circuit. For a particular setting of $C_4$ and $R_3$ the bridge 13 is balanced by adjusting $R_1$ and $C_1$; and at balance $Z_2' = Z_3 Z_1 / Z_4$. The dynamic impedance $Z_2'$ will be equal to the vector sum of the stationary or intrinsic impedance $Z_2^0$ of coil 2A and an effective impedance $E_2/I_2$ where $E_2$ is the back E. M. F. generated due to the motion of coil 2A in the magnetic field of flux density $B_2$. Thus $$Z_2' = Z_2^0 - E_2/I_2 \quad (2)$$

Since $E_2 = B_2 l_2 V$, where $V$ is the R. M. S. velocity of the driving tube (and hence coil 2A), we have $$Z_2' = Z_2^0 - B_2 l_2 V / I_2 \quad (3)$$

Now $V = F/Z_M$ where $F$ is the total applied force and $Z_M$ is the total mechanical impedance of the moving system so that $$Z_2' = Z_2^0 - B_2 l_2 F / Z_M I_2 \quad (4)$$

The total applied force $F$ is the vector sum of the forces on coils 1A and 2A and is given by $$F = F_1 + F_2 = B_1 l_1 I_1 + B_2 l_2 I_2$$

For convenience we let $B_1 l_1 = K_1$, $B_2 l_2 = K_2$ and $K_1/K_2 = a$, then $$Z_2' = Z_2^0 - K_2^2 (a I_1/I_2 + 1)/Z_M \quad (5)$$

Replacing the complex ratio $I_1/I_2$ by $r$ the final form for the equation $$Z_2' = Z_2^0 - K_2^2 (1 + ar)/Z_M \quad (6)$$

The dynamic electrical impedance $Z_2'$, which is the quantity that can be determined by balancing the bridge 13, is thus seen to depend on $Z_M$ and $r$ since $Z_2^0$, $a$, and $K_2^2$ are all constants (although $Z_2^0$ will vary somewhat with temperature). The current ratio, $r$, can be determined from the values of $R_A$ and $R_3$ since, when the bridge 13 is balanced, $I_1 = E/(R_A + Z_1')$ and $I_2 = E/(R_3 + Z_2')$ where $Z_2'$ and $Z_1'$ are the dynamic electrical impedances of coils 2A and 1A respectively. This gives $$r = I_1/I_2 = (R_3 + Z_2')/(R_A + Z_1')$$

$R_3$ and $R_A$ are known and $Z_2' \cong Z_1'$ can be found from the bridge balance so $r$ can always be calculated. However, in practice $R_3$ and $R_A$ are made very large compared to $Z_2'$ and $Z_1'$ so that the approximation $r \cong R_3/R_A$ is valid. The mechanical impedance therefore could be found from the expression $$Z_M = -K_2^2 (1 + ar)/(Z_2' - Z_2^0)$$

where $Z_2'$ is the measured dynamic electrical impedance of coil 2A, $Z_2^0$ is the intrinsic or stationary impedance value for 2A, and $K_2^2$, $a$, and $r = R_3/R_A$ are all known. However, this method is not satisfactory because of the difficulty of obtaining reliable values for the intrinsic impedance $Z_2^0$ of coil 2A at all frequencies and temperatures.

This difficulty and the necessity of making a series of separate measurements with the driving tube 10 clamped can be avoided as follows: the electrical impedance $Z_2'$ is measured for two values of the ratio $r$ and the mechanical admittance (and hence impedance) is found from the difference between the electrical impedances.

$$(Z_2')_1 = Z_2^0 - K_2^2 (1 + ar_1) Y_M$$
$$(Z_2')_2 = Z_2^0 - K_2^2 (1 + ar_2) Y_M$$

and subtracting $$Z_{12} = Y_M K^2 = [(Z_2')_1 - (Z_2')_2]/(r_2 - r_1) \quad (7)$$

where $aK_2^2 = K^2$ and $Y_M = 1/Z_M$. In terms of bridge components (see Figure 1) this gives $$Z_{12} = \frac{(R_3 Z_1/Z_4)_1 - (R_3 Z_1/Z_4)_2}{(R_3/R_A)_2 - (R_3/R_A)_1} \quad (8)$$

The current ratio can be varied by changing either $R_3$ or $R_A$ or both, but keeping them large compared to the dynamic electrical impedances of coils 1A and 2A. For the special case where the current ratio is changed by varying $R_A$ only, $$Z_{12} = \frac{(Z_1/Z_4)_1 - (Z_1/Z_4)_2}{(1/R_A)_2 - (1/R_A)_1} \quad (9)$$

giving a determination independent of the value of $R_3$. This is essential at high frequencies where the large value of $R_3$ ($\sim 10^5$ ohms) makes its shunt capacitance, $C_3$, ($\sim 10\mu\mu f$) of considerable importance giving an impedance, $Z_3$, instead of a simple resistance. Equation 9 determines $Z_{12}$ independently of any knowledge of $Z_3$.

An alternative is to measure $Z_2'$ with $E_2$ reversed keeping $r$ constant. Reversing $E_2$ will change the applied force, since $F_1$ will then be opposed instead of aided by $F_2$, i. e., $F = F_1 - F_2$ and Equation 6 becomes as shown in 6a.

$$(Z_2')_+ = Z_2^0 - K_2^2 (ar + 1)/Z_M \quad (6)$$
$$(Z_2')_- = Z_2^0 + K_2^2 (ar - 1)/Z_M \quad (6a)$$

Subtracting 6 from 6a we have $$Z_{12} = K^2/Z_M = [(Z_2')_- - (Z_2')_+]/2r$$

and since $R_3$ is unchanged $$Z_{12} = [(Z_1/Z_4)_- - (Z_1/Z_4)_+] R_A/2 \quad (10)$$

The impedance ratio $Z_1/Z_4$ appearing in Equations 8–10 is given by $Z_1/Z_4 = P + iQ$ where $P = \alpha R_1 \omega C_4/(1 + \alpha^2)$ and $Q = R_1 \omega C_4/(1 + \alpha^2)$; $\alpha = \omega R_1 C_1$ and $\omega = 2\pi \times$ frequency. For maximum precision the differences in dynamic electrical impedance should be as large as possible and this can be accomplished by making the differences in $r$ large (Equation 7) or $R_A$ small (Equation 10).

So far no detailed mention has been made of the effect of mutual inductance between coils 1A and 2A. Since the coils are coaxial, only 1.75 inches apart, and surround a soft iron core 33, it is clear that considerable coupling will exist, and serious interference could arise from this quarter whenever the motional E. M. F. generated in coil 2A is small compared to the E. M. F. of mutual inductance. To remove the difficulty a third, shielding coil 1B wound on the inside of a coil form is placed immediately around coil 1A, but not touching it. This shielding coil 1B is cemented to the pole piece while 1A is, of course, free to oscillate with the suspended driving tube 10. The shielding coil 1B is matched as nearly as possible to the driving coil 1A, but because of the slight difference in diameter and environment of the two coils, it is impossible to match their inductances exactly at all frequencies. Therefore the shielding coil 1B is placed in parallel with driving coil 1A, Figure 1, and the current through it adjusted in magnitude and phase until $I_A Z_t^a = I_B Z_t^b$ where $Z_t^a$ is the transfer impedance between coils 1A and 2A, and $Z_t^b$ is the transfer impedance between coils 1B and 2A. Then the induced E. M. F. in coil 2A is $$E_i = I_A Z_t^a - I_B Z_t^b = 0$$

In order to know when $I_B$ has been adjusted to the proper value, a fourth, stationary coil 2B is placed on the inside of a coil form just outside of coil 2A. With the bridge circuit open ($S_B$ out) and coil 2B placed across the detector (S closed) $R_B$ and $C_B$ are adjusted to give zero output in coil 2B. The assumption is made that when there is zero induced voltage in coil 2B there will likewise be no induced voltage in coil 2A because of their nearly identical locations. This adjustment is made at each frequency before determining $Z_2'$.

The source 15 is a power amplifier driven by an audio-frequency sine wave oscillator such as a beat frequency oscillator; this allows a large current to be furnished to the driving coils 1A and 2A with low distortion. A shielded transformer 16 is used to isolate the bridge 13 from the detector 17 which, for example, may consist of an amplifier 18 which feeds the detector 17 with suitable filter circuits. To avoid overloading when way off balance, a 200,000 ohm resistor $R_G$ is used as a potential divider across the output of the bridge transformer 16 to allow regulation of the unbalanced voltage supplied to the amplifier 18. The current through driving coil 1A is read from a vacuum tube voltmeter 19 placed across a 10-ohm resistor in series with $R_A$.

The material tested is subjected to a sinusoidal shearing stress in the apparatus shown in cross-section in Figure 3 and in end view in Figure 4. Two sample discs 11 of nearly identical dimensions are pressed outward from a stainless steel floating or suspended mass 12 against the inside flat sections 20 of the driving tube 10 (Figure 2). It will be understood that the driving tube 10 and the mass 12 constitute material support members and they are so referred to in the appended claims. Enough compression is applied to prevent slipping between the sample discs 11 and the driving tube 10 or the suspended mass 12. This is done with a non-magnetic stainless steel micrometer head (not shown) which pushes a tapered extension rod through the floating mass 12 forcing out two ¾ inch diameter cylinders 23 at right angles to the axis of travel. The assembly is calibrated to give the perpendicular travel of the cylinders 23 in terms of the micrometer setting so that sample thickness can be measured to within ±.001 inch, but more accurate values, ±.01 mm., are obtained by observations with a traveling telescope. The cylinders 23 can be locked in place by set screws 24 which force brass pins 25 against them, allowing removal of the micrometer head and tapered rod. Two 3⁄16 inch diameter Phosphor bronze extension springs 26 pull the cylinders 23 in to release pressure on the samples 11 and force the extension rod out as the micrometer is backed off.

The driving tube 10 has two coils 1A and 2A cemented to it and transmits the actual shearing stress to the samples 11. There are four major considerations in its design: (1) the mass of the tube 10 and coils 1A and 2A should be as small as possible; (2) the entire unit must be rigid; (3) large variations in temperature (−50 to +150° C.) must be withstood without distortion or softening; and (4) provision must be made to prevent the presence of any but the motional E. M. F. in coil 2A. The last has already been discussed; the others are met by winding driving coil 1A on a split form 27 of non-magnetic material, such as an aluminum alloy 2½ inches long with a wall thickness of 0.010 inch, and driving coil 2A on a non-conducting section 28 made up of layers of paper and cement extending 1¼ inches beyond the form 27 or metal section. The non-conducting form or section 28 is essential for coil 2A to prevent interference from eddy currents, while the metal section 27 is split to prevent a short circuit in the magnetic field. This particular tube 10 has a total mass of 33.191 grams and shows no fundamental resonance below 50,000 C. P. S. The non-conducting section 28 butts up to and overlaps the metallic section 27 ½ inch and is formed and cured separately and then cemented to the form 27. The shielding coil 1B and stationary pick-up coil 2B are wound on the inside of coil forms which are then cemented to the pole pieces 29 and 30. When properly centered by adjusting the eight support wire bolts 31 the clearance between the magnet core 33 and driving tube 10 is 0.020 inch and that between the stationary and moving coils is 0.020 inch.

A ring magnet 34, 6 inches long with a wall thickness of ¾ inch and outside diameter of 9 inches, provides the magnetic fields in which the driving coils 1A and 2A are located. This magnet 34 was cast in four sections and assembled demagnetized with inverted pole pieces 29, and the entire unit was fitted into the large aluminum collar or housing 41 as indicated in Figure 3. The pole pieces 29 are machined from soft iron and designed inverted, i. e., with the ends 36 drawn in to bring the poles of the magnet close together (thus allowing for a short driving tube) and yet provide for a long magnet to give a high flux density in the annular air gaps 37 and 38.

Aluminum end plates 39 and 40 are bolted to a magnet collar 41. The back end plate 39 has a hub 42 which fits inside the pole piece 30 and to which is fastened the magnet core 33. The core 33 is made of soft iron and has a diameter of 1.80 inches with ¾ inch wide flats along the sides corresponding to similar flat sections 44 on the floating mass 12.; the pole pieces 29 and 30 have an inside diameter of 2.00 inches so that each working gap 37 and 38 is 0.10 inch and has a nominal flux density of 10,000 gauss.

Cover plates 45 are used to seal off the ends of the instrument to allow for immersion in a constant temperature bath (not shown). Suitable gaskets are used each having a tongue 46 interfitting with a groove 47 in the respective end plate with a gasket 48 therebetween. Gaskets are also used to seal both caps 49 to the magnet collar 41. Coil leads and thermocouple wires are brought out through aluminum alloy tubes 50.

The complete apparatus is suspended on four vibration insulators (not shown) to isolate it from building vibration above 20 cps. With the apparatus sealed as shown, it is immersed in a constant temperature liquid bath, such as water, mineral oil, gasoline, etc., to obtain temperatures ranging from −50 to +150° C. The temperature of the driving tube 10, measured by a multiple-junction thermocouple, is taken as the sample temperature after enough time for thermal equilibrium has elapsed. The thermocouple junctions are located in flat sections 20 of the driving tube 10 less than 0.050 inch from each sample face so that the sample temperature cannot differ appreciably from that indicated by the thermocouple.

The manner in which the constant $K^2$ is determined will now be described. This constant in theory could be determined from the length of wire on coils 1A and 2A and measured values of coils $B_1$ and $B_2$ if a uniform flux density existed throughout the regions where the coils are located. In practice, however, an experimental value of $K^2$ is found. This is readily accomplished if the driving tube system (without a sample) can be represented by a mechanical circuit as shown in Figure 5. Then the total mechanical impedance of the moving system is $Z_M^0 = R_M^0 + j(\omega m - S_M^0/\omega)$ where $m$ is the mass of the coils 1A and 2A and tube 10, $S_M^0$ is a small mechanical elastance contributed by the eight support wires 52, and $R_M^0$ is a small residual mechanical resistance due to stretching of the support wires 52 and air resistance. It is convenient to use the electrical admittance $Y_{12}^0 = 1/Z_{12}^0$ for the determination of $K^2$, for then $Y_{12}^0 = Z_M^0/K^2$ (Equation 7) or if $Y_{12}^0 = G_{12}^0 + iB_{12}^0$ we have $G_{12}^0 = R_M^0/K^2$ and $B_{12}^0 = (\omega m - S_M^0/\omega)K^2$. Rearranging this last expression we have:

$$\omega B_{12}^0 = \omega^2 m/K^2 - S_M^0/K^2 \tag{11}$$

so that by plotting $\omega B_{12}^0$ vs. $\omega^2$ a straight line of slope $m/K^2$ and intercept $S_M{}^0/K^2$ is obtained. Since $m$, the mass of the driving coils 1A and 2A is known, $K^2$ can be determined from the measured value of the slope of this line. If this is done, a straight line is obtained as expected and a constant value of $K^2=2.50\times10^6$ ohm-dyne-sec./cm. is obtained.

In order to avoid mechanical coupling between the driving tube 10 and the body of the apparatus, the sample discs 11 are sheared between the tube 10 and the heavy mass 12 as previously noted. The mass 12 is suspended by eight phosphor bronze wires 53 which represent the only connection between it and the bulk of the apparatus. This eliminates the direct introduction of stray resonances but makes it necessary to take into account the effect of any slight motion of the mass. This is readily accomplished by subtracting the mechanical compliance of the heavy mass 12 ($\sim 1/\omega M$) which can be experimentally determined by measurements made with the driving tube 10 and floating mass 12 directly connected.

In order to measure the complex shear modulus of a liquid, the method disclosed herein for gels and solids applies except that the manner of holding the sample must be modified. With the present apparatus this can be most easily accomplished by introducing the liquid sample into the transducer inside a thin shell or skin of very soft material.

Figure 6:
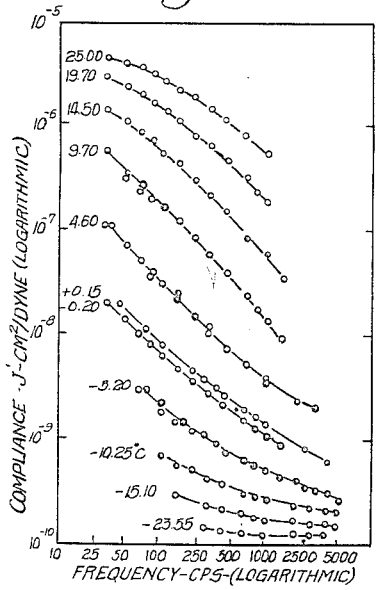
Figure 6 shows curves which demonstrate the variation of the real part of the dynamic shear compliance, J', with frequency and temperature for a polyvinyl chloride-dimethyl thianthrene gel (10% polymer by volume)
Figure 7:
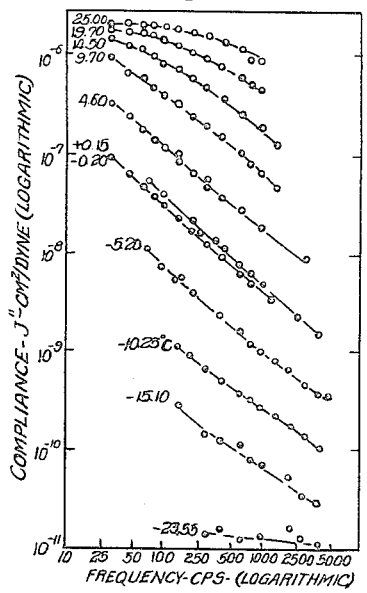
Figure 7 shows curves which demonstrate the variation of the imaginary part of the dynamic shear compliance, J'', with frequency and temperature for a polyvinyl chloride-dimethyl thianthrene gel.

Measurements have been made using the apparatus disclosed herein on (a) a sample of 10% polyvinyl chloride by volume dissolved in dimethyl thianthrene which gives a gel-like material at room temperature, Figures 6 and 7, (b) 40% polyvinyl chloride by volume combined with dimethyl thianthrene, a flexible plastic material of leathery nature, Figures 8 and 9, (c) a concentrated solution of polystyrene (60%) in decalin, a putty-like material, and (d) on polyisobutylene, a rubber. In general as it now stands, the apparatus can be used for measurements of complex shear modulus or complex shear compliance (and related quantities) on samples varying from concentrated solutions and weak gels to hard glassy materials and including rubbers, both vulcanized and non-vulcanized. Other substances whose properties can be measured with this apparatus are, for example: wood, shock absorbing materials, sound absorbing materials, foodstuffs such as cheese, waxes, tars, and leather and leather substitutes. It can also be used to study changes in mechanical properties occurring during vulcanization of a rubber or the softening of a plastic or any physical, chemical or biological process which alters mechanical properties. Some typical results are shown in Figures 6 to 9 where the variations of shear modulus and shear compliance with frequency and temperature are given for some of the materials previously mentioned.

As an alternative to shearing the sample between a lightweight driving tube and a heavy mass it is possible to use two driving tubes moving out of phase with each other to shear the sample. In this case the heavy mass is replaced, for example, by a second driving tube which is suspended coaxially with the first. Alternating currents can then be passed through coils wound on the driving tubes in such a way that the two tubes move with different velocities which, in general, may be of different magnitudes and out of phase with each other. A sample of viscoelastic material can thus be sheared between the driving tubes, and its mechanical impedance determined from the measured dynamic electrical impedance of a coil on either tube by means of the electrical circuit already described.

Since certain changes can be made in the foregoing construction and different embodiments of the invention can be made without departing from the spirit and scope thereof, it is intended that all matters shown in the accompanying drawings and described hereinbefore shall be interpreted as illustrative and not in a limiting sense.

What is claimed as new is:

1. Means for determining dynamic mechanical properties of viscoelastic material comprising, in combination, unidirectional flux means, a pair of coils rigidly mechanically coupled and mounted for movement along a common axis transverse to flux from said flux means, means for energizing both of said coils with alternating current whereby they and their coupling means are oscillated conjointly along said axis as a result of the interaction between said flux and the flow of alternating current in said coils and explicit determination of the intrinsic impedance thereof is unnecessary, means for connecting the material to be tested to said coils including two support members between which the material is positioned with one support member being connected to and movable conjointly with said coils and relative to the other support member whereby the material is stressed when said coils are oscillated, and measuring means connected to one of said coils to determine the complex ratio of the oscillating force acting on said coils to the resulting velocity with which they oscillate, the ratio being known as mechanical impedance.

2. Means for determining dynamic mechanical properties of viscoelastic material comprising, in combination, unidirectional flux means, a pair of coils rigidly mechanically coupled and mounted for movement along a common axis transverse to flux from said flux means, means for energizing both of said coils with alternating current whereby they and their coupling means are oscillated conjointly along said axis as a result of the interaction between said flux and the flow of alternating current in said coils and explicit determination of the intrinsic impedance thereof is unnecessary, means for eliminating mutual induction between said coils, means for connecting the material to be tested to said coils including two support members between which the material is positioned with one support member being connected to and movable conjointly with said coils and relative to the other support member whereby the material is stressed when said coils are oscillated, and measuring means connected to one of said coils to determine the complex ratio of the oscillating force acting on said coils to the resulting velocity with which they oscillate, the ratio being known as mechanical impedance.

3. Means for determining dynamic mechanical properties of viscoelastic material comprising, in combination, unidirectional flux means, a pair of coils rigidly mechanically coupled and mounted for movement along a common axis transverse to flux from said flux means, means for energizing both of said coils with alternating current whereby they and their coupling means are oscillated conjointly along said axis as a result of the interaction between said flux and the flow of alternating current in said coils and explicit determination of the intrinsic impedance thereof is unnecessary, means for reducing mutual induction between said coils, means cooperating with said coils for determining the degree that mutual induction therebetween has been reduced, means for connecting the material to be tested to said coils including two support members between which the material is positioned with one support member being connected to and movable conjointly with said coils and relative to the other support member whereby the material is stressed when said coils are oscillated, and measuring means connected to one of said coils to determine the complex ratio of the oscillating force acting on said coils to the resulting velocity with which they oscillate, the ratio being known as mechanical impedance.

4. Means for determining dynamic mechanical properties of viscoelastic material comprising, in combination, unidirectional flux means, a pair of coils rigidly mechanically coupled and mounted for movement along a common axis transverse to flux from said flux means, means for energizing both of said coils with alternating current whereby they and their coupling means are oscillated conjointly along said axis as a result of the interaction between said flux and the flow of alternating current in said coils and explicit determination of the intrinsic impedance thereof is unnecessary, clamp means for holding the material to be tested to said coils including two support members between which the material is clamped with one support member connected to and movable conjointly with said coils and relative to the other support member whereby the material has only shearing stress applied thereto when said coils are oscillated, and measuring means connected to one of said coils to determine the complex ratio of the oscillating force acting on said coils to the resulting velocity with which they oscillate, the ratio being known as mechanical impedance.

5. Means for determining dynamic mechanical properties of viscoelastic material comprising, in combination, permanent magnet means disposed to cause magnetic flux to cross an annular air gap, a non-magnetic driving tube and means mounting the same for movement in said air gap transverse to said flux, a pair of coils fixed to said driving tube and movable therewith in said air gap perpendicular to said flux, means for energizing both of said coils with alternating current whereby said driving tube and said coils are oscillated and explicit determination of the intrinsic impedance thereof is unnecessary, supporting means for the material to be tested mounted for movement independent of said driving tube and having means to secure a portion of said material to said driving tube whereby said portion moves relative to another portion thereof when said coils are energized, and means connected to one of said coils for measuring the complex ratio of the oscillating force acting on said coils to the resulting velocity with which they oscillate, this ratio being termed mechanical impedance.

6. Means for determining dynamic mechanical properties of viscoelastic material comprising, in combination, permanent magnet means disposed to cause magnetic flux to cross an annular air gap, a non-magnetic driving tube, tension wires mounting said driving tube for movement in said air gap transverse to said flux, a pair of coils fixed to said driving tube and movable therewith in said air gap perpendicular to said flux, means for energizing both of said coils with alternating current whereby said driving tube and said coils are oscillated and explicit determination of the intrinsic impedance thereof is unnecessary, supporting means for the material to be tested mounted for movement independent of said driving tube and having means to secure a portion of said material to said driving tube whereby said portion moves relative to another portion thereof when said coils are energized, and means connected to one of said coils for measuring the complex ratio of the oscillating force acting on said coils to the resulting velocity with which they oscillate, this ratio being termed mechanical impedance.

7. Means for determining dynamic mechanical properties of viscoelastic material comprising, in combination, permanent magnet means and core means providing a pair of coaxial annular longitudinally spaced air gaps across which there is magnetic flux flow along radial paths, a non-magnetic driving tube and means mounting the same for movement in said air gaps transverse to said flux, a pair of coils fixed to said driving tube in the same longitudinal spaced relation as said air gaps and movable with said driving tube perpendicular to the flux in the respective air gap, means for energizing both of said coils with alternating current whereby said driving tube and said coils are oscillated and explicit determination of the intrinsic impedance thereof is unnecessary, supporting means for the material to be tested mounted for movement independent of said driving tube and having means to secure a portion of said material to said driving tube whereby said portion moves relative to another portion thereof when said coils are energized, and means connected to one of said coils for measuring the complex ratio of the oscillating force acting on said coils to the resulting velocity with which they oscillate, this ratio being termed mechanical impedance.

8. The invention, as set forth in claim 7, wherein that portion of the driving tube carrying one of the coils is formed of insulating material and the remainder of said driving tube is formed of metal.

9. Means for determining dynamic mechanical properties of viscoelastic material comprising, in combination, permanent magnet means disposed to cause magnetic flux to cross an annular air gap, a non-magnetic driving tube and means mounting the same for translatory movement in said air gap transverse to said flux, a pair of coils fixed to said driving tube and movable therewith in said air gap perpendicular to said flux, means for energizing both of said coils with alternating current whereby said driving tube and said coils are oscillated and explicit determination of the intrinsic impedance thereof is unnecessary, a material support member and means mounting the same for translatory movement coaxially and independently of said driving tube with the material to be tested arranged to be disposed between it and said support member whereby the portions of the material in contact, respectively, with said driving tube and said support member move relative to each other when said coils are energized, and means connected to one of said coils for measuring the complex ratio of the oscillating force acting on said coils to the resulting velocity with which they oscillate, this ratio being termed mechanical impedance.

10. Means for determining dynamic mechanical properties of viscoelastic material comprising, in combination, permanent magnet means disposed to cause magnetic flux to cross an annular air gap, a non-magnetic driving tube and means mounting the same for translatory movement in said air gap transverse to said flux, a pair of coils fixed to said driving tube and movable therewith in said air gap perpendicular to said flux, means for energizing both of said coils with alternating current whereby said driving tube and said coils are oscillated and explicit determination of the intrinsic impedance thereof is unnecessary, a material support member, tension wires mounting said support member for translatory movement coaxially and independently of said driving tube with the material to be tested arranged to be disposed between it and said support member whereby the portions of the material in contact, respectively, with said driving tube and said support member move relative to each other when said coils are energized, and means connected to one of said coils for measuring the complex ratio of the oscillating force acting on said coils to the resulting velocity with which they oscillate, this ratio being termed mechanical impedance.

11. Means for determining dynamic mechanical properties of viscoelastic material comprising, in combination, permanent magnet means disposed to cause magnetic flux to cross an annular air gap, a non-magnetic driving tube and means mounting the same for translatory movement in said air gap transverse to said flux, a pair of coils fixed to said driving tube and movable therewith in said air gap perpendicular to said flux, means for energizing both of said coils with alternating current whereby said driving tube and said coils are oscillated and explicit determination of the intrinsic impedance thereof is unnecessary, a material support member telescoped with said driving tube with the material to be tested segregated into two parts and arranged to be disposed between diametrically opposite outer areas of said support member and corresponding inner areas of said driving tube, means mounting said support member for translatory movement coaxially and independently of said driving tube, and means connected to one of said coils to determine the complex ratio of the oscillating force acting on said coils to the resulting velocity with which they oscillate, this ratio being termed mechanical impedance.

12. Means for determining dynamic mechanical properties of viscoelastic material comprising, in combination, permanent magnet means and core means providing a pair of coaxial annular longitudinally spaced air gaps across which there is magnetic flux flow along radial paths, a non-magnetic driving tube and means mounting the same for movement in said air gaps transverse to said flux, a pair of coils fixed to said driving tube in the same longitudinal spaced relation as said air gaps and movable with said driving tube perpendicular to the flux in the respective air gap, means for energizing both of said coils with alternating current whereby said driving tube and said coils are oscillated and explicit determination of the intrinsic impedance thereof is unnecessary, a material support member telescoped with said driving tube with the material to be tested segregated into two parts and arranged to be disposed beween diametrically opposite outer areas of said support member and corresponding inner areas of said driving tube, means mounting said support member for translatory movement coaxially and independently of said driving tube, and means connected to one of said coils to determine the complex ratio of the oscillating force acting on said coils to the resulting velocity with which they oscillate, this ratio being termed mechanical impedance.

13. Means for determining dynamic mechanical properties of viscoelastic material comprising, in combination, permanent magnet means disposed to cause magnetic flux to cross an annular air gap, a non-magnetic driving tube, tension wires mounting said driving tube for translatory movement in said air gap transverse to said flux, a pair of coils fixed to said driving tube and movable therewith in said air gap perpendicular to said flux, means for energizing both of said coils with alternating current whereby said driving tube and said coils are oscillated and explicit determination of the intrinsic impedance thereof is unnecessary, a material support member telescoped with said driving tube with the material to be tested segregated into two parts and arranged to be disposed between diametrically opposite outer areas of said support member and corresponding inner areas of said driving tube, tension wires mounting said support member for translatory movement coaxially and independently of said driving tube, and means connected to one of said coils to determine the complex ratio of the oscillating force acting on said coils to the resulting velocity with which they oscillate, this ratio being termed mechanical impedance.

14. Means for determining dynamic mechanical properties of viscoelastic material comprising, in combination, permanent magnet means disposed to cause magnetic flux to cross an annular air gap, a non-magnetic driving tube and means mounting the same for translatory movement in said air gap transverse to said flux, a pair of coils fixed to said driving tube and movable therewith in said air gap perpendicular to said flux, means for energizing both of said coils with alternating current whereby said driving tube and said coils are oscillated and explicit determination of the intrinsic impedance thereof is unnecessary, supporting means for the material to be tested mounted for movement independent of said driving tube and having means to secure a portion of said material to said driving tube whereby said portion moves relative to another portion thereof when said coils are energized, fluid tight housing means for the aforesaid elements whereby the same can be immersed in liquid maintained at various temperatures to test the material at such temperatures, and means connected to one of said coils for measuring the complex ratio of the oscillating force acting on said coils to the resulting velocity with which they oscillate, this ratio being termed mechanical impedance.

15. Means for determining dynamic mechanical properties of viscoelastic material comprising, in combination, permanent magnet means disposed to cause magnetic flux to cross an annular air gap, a non-magnetic driving tube and means mounting the same for translatory movement in said air gap transverse to said flux, a pair of coils fixed to said driving tube and movable therewith in said air gap perpendicular to said flux, means for energizing both of said coils with alternating current whereby said driving tube and said coils are oscillated and explicit determination of the intrinsic impedance thereof is unnecessary, a material support member telescoped with said driving tube with the material to be tested segregated into two parts and arranged to be disposed between diametrically opposite outer areas of said support member and corresponding inner areas of said driving tube, radially outwardly movable members carried by said support member and providing at their outer ends said outer areas, means holding said outwardly movable members in operative position, means mounting said support member for translatory movement coaxially and independently of said driving tube, and means connected to one of said coils to determine the complex ratio of the oscillating force acting on said coils to the resulting velocity with which they oscillate, this ratio being termed mechanical impedance.

16. In electrical measuring means, in combination, a first coil, a second coil in spaced relation to said first coil, means mechanically rigidly interconnecting said coils whereby movement of one is accompanied by corresponding movement of the other along a common axis, unidirectional flux means disposed in cooperative relation to said coils, means mounting said coils for translatory movement transversely to flux from said unidirectional flux means, means for energizing both of said coils with alternating current whereby they are oscillated conjointly along said axis as a result of the interaction between said flux and the flow of alternating current in said coils and explicit determination of the intrinsic impedance thereof is unnecessary, and measuring means connected to one of said coils for determining the voltage generated therein as a result of motion thereof in said flux.

17. In electrical measuring means, in combination, unidirectional flux means, first and second coils rigidly mechanically coupled and mounted for movement along a common axis in close proximity in and transversely to the flux from said flux means, means for connecting said coils for energization to a source of alternating current whereby they are oscillated conjointly along said axis as a result of the interaction between said flux and the flow of alternating current in said coils and explicit determination of the intrinsic impedance thereof is unnecessary, measuring means connected to one of said coils for determining the voltage generated therein as a result of motion thereof in said flux, and a shielding coil in close proximity to said first coil and connected for energization to said source of alternating current to reduce the mutual induction between said first and second coils.

18. Means for determining dynamic mechanical properties of viscoelastic material comprising, in combination, a first material support member, a second material support member disposed in cooperative relation to said first material support member so as to receive therebetween a sample of material whose viscoelastic properties are to be measured, means cooperating with said support members to apply sufficient compressive stress to said sample to hold the same in contact with said support members without slipping when the same are oscillated relative to each other sufficiently to apply shearing stress to said sample, wire tension means individual to each of said support members for mounting the same for translatory movement in space substantially free of friction, means for translatorily moving said support members relative to each other to apply shearing stress to the sample of material, and means for measuring such movement.

19. Means for determining dynamic mechanical properties of viscoelastic material comprising, in combination, a first material support member having substantial mass, a second material support member having relatively small mass as compared to said first material support member and disposed in cooperative relation thereto so as to receive therebetween a sample of material whose viscoelastic properties are to be measured, means carried by said first material support member to apply sufficient compressive stress to said sample to hold the same in contact with said support members without slipping when said second material support member is oscillated relative to said first support member sufficiently to apply shearing stress to said sample, wire tension means individual to each of said support members for mounting the same for translatory movement in space substantially free of friction, means for translatorily moving said support members relative to each other to apply shearing stress to the sample of material, and means for measuring such movement.

20. Means for determining the complex ratio of the oscillating force acting on two coils to the resulting velocity with which they oscillate comprising, in combination, means rigidly mechanically coupling said coils to move conjointly along a common axis, unidirectional flux means applying unidirectional flux transversely of said coils, a bridge circuit having one of said coils connected in one of its arms, and circuit means connecting the other of said coils and said bridge circuit in parallel circuit relation and for energization to a source of alternating current whereby both of said coils and their coupling means are oscillated along said axis.

21. Means for determining the complex ratio of the oscillating force acting on two coils to the resulting velocity with which they oscillate comprising, in combination, means rigidly mechanically coupling said coils to move conjointly along a common axis, unidirectional flux means applying unidirectional flux transversely of said coils, a bridge circuit having one of said coils connected in one of its arms, circuit means connecting the other of said coils and said bridge circuit in parallel circuit relation and for energization to a source of alternating current whereby both of said coils and their coupling means are oscillated along said axis, and a shielding coil in close proximity to said coils and connected for energization to said source of alternating current to reduce mutual induction between said coils.

22. Means for determining dynamic mechanical properties of viscoelastic material comprising, in combination, a first material support member, a second material support member disposed in cooperative relation to said first material support member so as to receive therebetween a sample of material whose viscoelastic properties are to be measured, means cooperating with said support members to apply sufficient compressive stress to said sample to hold the same in contact with said support members without slipping when the same are oscillated relative to each other sufficiently to apply shearing stress to said sample, means individual to said support members for carrying the same so they are movable in space substantially free of friction, oscillatory electro-magnetic means operable at frequencies of several cycles per second for moving one of said support members relative to the other so that the same oscillates continuously at any predetermined frequency within the range of said electromagnetic means, and means connected to at least one of said support members for measuring such movement.

23. Means for determining dynamic mechanical properties of viscoelastic material comprising, in combination, a first material support member having substantial mass, a second material support member having relatively small mass as compared to said first material support member and disposed in cooperative relation thereto so as to receive therebetween a sample of material whose viscoelastic properties are to be measured, means carried by said first material support member to apply sufficient compressive stress to said sample to hold the same in contact with said support members without slipping when said second material support member is oscillated relative to said first support member sufficiently to apply shearing stress to said sample, means individual to said support members for carrying the same so they are movable in space substantially free of friction, oscillatory electro-magnetic means operable at frequencies of several cycles per second for moving said second material support member relative to said first material support member so that the same oscillates continuously at any predetermined frequency within the range of said electromagnetic means, and means connected to said second material support member for measuring such movement.

24. Means for determining the complex ratio of the oscillating force acting on two coils to the resulting velocity with which they oscillate comprising, in combination, means rigidly mechanically coupling said coils to move conjointly along a common axis, including a material support member; said coils, connecting means and support member having relatively small mass; another material support member having relatively great mass as compared to said small mass and disposed in cooperative relation to the first mentioned support member so as to receive therebetween a sample of material whose complex ratio is to be determined, means carried by said other support member to apply sufficient compressive stress to said sample to hold the same in contact with said support members without slipping when said first mentioned support member is oscillated relative to said other support member sufficiently to apply shearing stress to said sample, means individual to said support members for carrying the same so they are movable in space substantially free of friction, unidirectional flux means applying unidirectional flux transversely of said coils, a bridge circuit having one of said coils connected in one of its arms, and circuit means connecting the other of said coils and said bridge circuit in parallel circuit relation and for energization to a source of alternating current whereby both of said coils and their coupling means are oscillated along said axis.

References Cited in the file of this patent

UNITED STATES PATENTS

| Number | Name | Date |
| --- | --- | --- |
| 1,880,425 | Flanders | Oct. 4, 1932 |
| 2,037,529 | Mooney | Apr. 14, 1936 |
| 2,141,277 | Nickel | Dec. 27, 1938 |
| 2,150,377 | Keinath | Mar. 14, 1939 |
| 2,355,194 | Wiggins | Aug. 8, 1944 |
| 2,427,796 | McDonald | Sept. 23, 1947 |
| 2,494,671 | Schaevitz | Jan. 17, 1950 |
| 2,526,338 | Ehlschlager | Oct. 17, 1950 |
| 2,550,052 | Fay | Apr. 24, 1951 |
| 2,593,389 | Nielsen | Apr. 15, 1952 |